United States Patent
Robertson, Jr.

(10) Patent No.: US 10,428,684 B2
(45) Date of Patent: Oct. 1, 2019

(54) TURBINE AIRFOIL WITH ADDITIVE MANUFACTURED REINFORCEMENT OF THERMOPLASTIC BODY

(71) Applicant: UNITED TECHNOLOGIES CORPORATION, Farmington, CT (US)

(72) Inventor: Thomas J. Robertson, Jr., Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 632 days.

(21) Appl. No.: 15/107,591

(22) PCT Filed: Jan. 9, 2015

(86) PCT No.: PCT/US2015/010717
§ 371 (c)(1),
(2) Date: Jun. 23, 2016

(87) PCT Pub. No.: WO2015/147964
PCT Pub. Date: Oct. 1, 2015

(65) Prior Publication Data
US 2016/0333733 A1 Nov. 17, 2016

Related U.S. Application Data

(60) Provisional application No. 61/933,332, filed on Jan. 30, 2014.

(51) Int. Cl.
*F01D 9/04* (2006.01)
*F01D 25/00* (2006.01)
(Continued)

(52) U.S. Cl.
CPC .......... *F01D 25/005* (2013.01); *B22F 3/1055* (2013.01); *B22F 5/04* (2013.01);
(Continued)

(58) Field of Classification Search
CPC ........ F01D 9/041; F01D 25/005; F01D 5/147; F01D 17/162; F05D 2240/12; F05D 2250/90; B33Y 80/00; B33Y 10/00
See application file for complete search history.

(56) References Cited

U.S. PATENT DOCUMENTS 5,380,152 A  1/1995  Sikorski et al.
5,634,771 A *  6/1997  Howard ................. F01D 5/147
                                                        416/229 R
(Continued)

FOREIGN PATENT DOCUMENTS

DE  3015208 A1  11/1981
EP  0764764 A1  3/1997
(Continued)

OTHER PUBLICATIONS

Supplementary European Search Report for European Application No. 15770220.0 dated Feb. 21, 2017.
(Continued)

*Primary Examiner* — Ninh H. Nguyen
*Assistant Examiner* — Maxime M Adjagbe
(74) *Attorney, Agent, or Firm* — Carlson, Gaskey & Olds, P.C.

(57) ABSTRACT

A component for a gas turbine engine comprises an airfoil body formed of a plastic. A reinforcement portion has webs formed of a metallic material and extend into the airfoil. A gas turbine engine, and a method of forming a component for use in a gas turbine engine are also disclosed.

17 Claims, 2 Drawing Sheets

(51) Int. Cl.
| | |
|---|---|
| *B29C 70/68* | (2006.01) |
| *B33Y 80/00* | (2015.01) |
| *B33Y 30/00* | (2015.01) |
| *F01D 5/14* | (2006.01) |
| *F01D 17/16* | (2006.01) |
| *B22F 3/105* | (2006.01) |
| *B22F 7/08* | (2006.01) |
| *B33Y 10/00* | (2015.01) |
| *B22F 5/04* | (2006.01) |
| *B29C 45/14* | (2006.01) |
| B29K 705/00 | (2006.01) |
| B29L 31/08 | (2006.01) |

(52) U.S. Cl.
CPC .......... *B22F 7/08* (2013.01); *B29C 45/14819* (2013.01); *B29C 70/68* (2013.01); *B33Y 10/00* (2014.12); *B33Y 30/00* (2014.12); *B33Y 80/00* (2014.12); *F01D 5/147* (2013.01); *F01D 9/041* (2013.01); *F01D 17/162* (2013.01); *B22F 2999/00* (2013.01); *B29K 2705/00* (2013.01); *B29L 2031/082* (2013.01); *F05D 2220/32* (2013.01); *F05D 2240/12* (2013.01); *F05D 2250/11* (2013.01); *F05D 2250/75* (2013.01); *F05D 2300/43* (2013.01); *F05D 2300/436* (2013.01); *F05D 2300/44* (2013.01); *F05D 2300/603* (2013.01); *Y02P 10/295* (2015.11)

(56) References Cited

U.S. PATENT DOCUMENTS

| | | |
|---|---|---|
| 7,089,664 B2 | 8/2006 | Ohishi |
| 8,360,760 B2 | 1/2013 | Pekrul |
| 8,383,028 B2 | 2/2013 | Lyons |
| 2004/0237521 A1 | 12/2004 | Ohishi |
| 2009/0081032 A1 | 3/2009 | Moroso et al. |
| 2012/0201686 A1 | 8/2012 | Fromentin et al. |
| 2015/0064015 A1 | 3/2015 | Perez |
| 2015/0337667 A1* | 11/2015 | Slavens .................... F01D 5/18 416/1 |
| 2016/0130958 A1 | 5/2016 | Ganoe et al. |

FOREIGN PATENT DOCUMENTS

| | | |
|---|---|---|
| EP | 0980962 | 2/2000 |
| JP | 2013052624 A | 3/2013 |

OTHER PUBLICATIONS

International Preliminary Report on Patentability for International Application No. PCT/US2015/010717 dated Aug. 11, 2016.

The International Search Report and Written Opinion for PCT Application No. PCT/US2015/010717, dated Sep. 24, 2015.

* cited by examiner

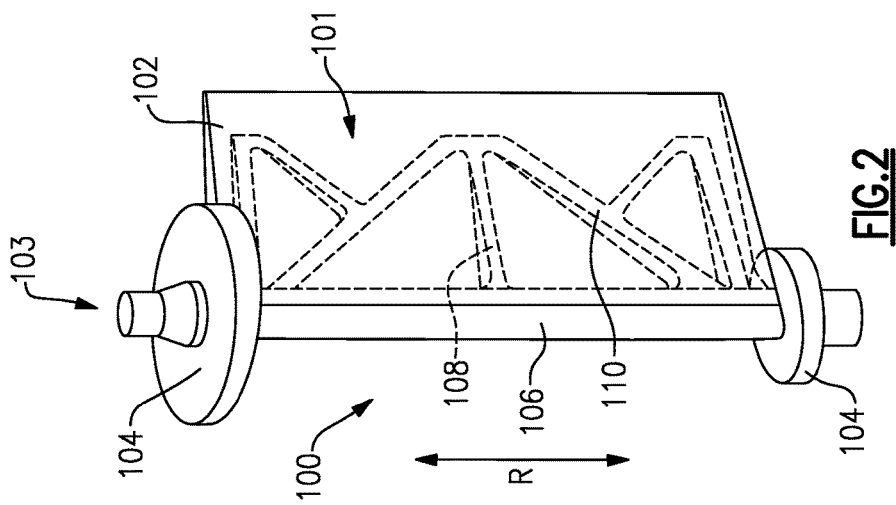
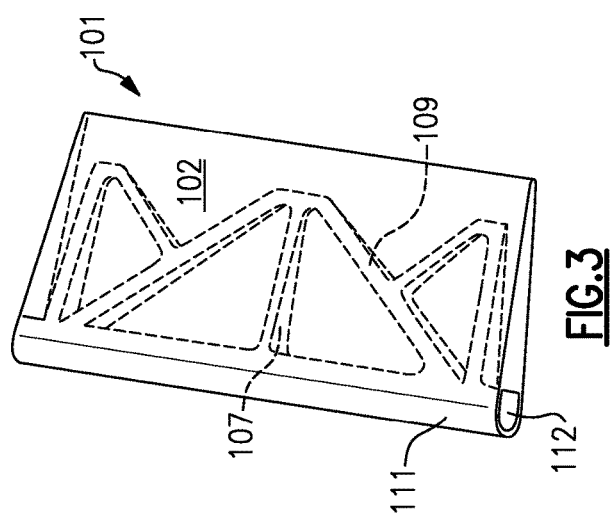
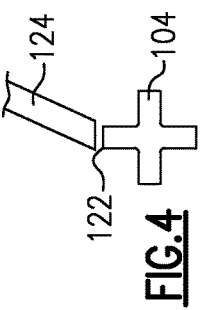
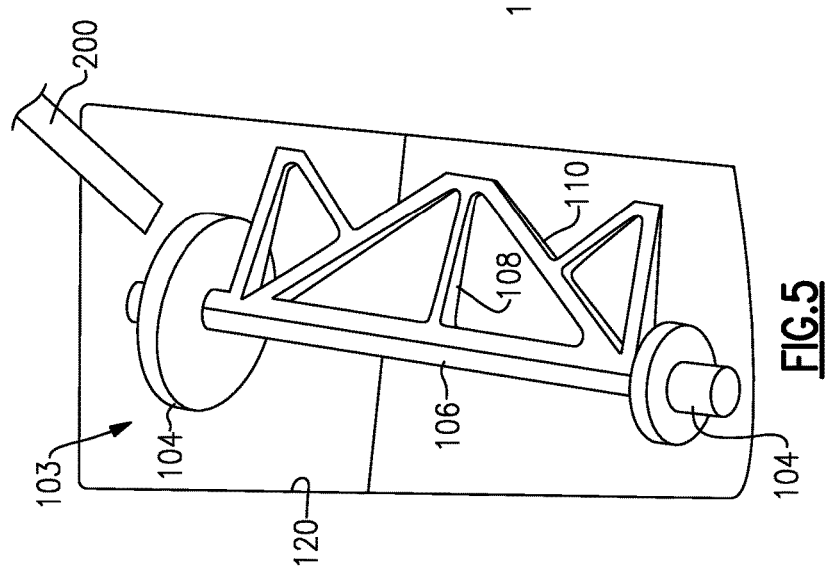

US 10,428,684 B2

TURBINE AIRFOIL WITH ADDITIVE MANUFACTURED REINFORCEMENT OF THERMOPLASTIC BODY

CROSS-REFERENCE TO RELATED APPLICATION

This application claims priority to U.S. Provisional Patent Application No. 61/933,332, filed Jan. 30, 2014.

BACKGROUND OF THE INVENTION

This application relates to an airfoil for use in a gas turbine engine wherein the airfoil has a body formed of a molded plastic and a reinforcement formed by additive manufacturing.

Gas turbine engines are known and, typically, include a fan delivering air into a compressor. Air is compressed and passed into a combustion section where it is mixed with fuel and ignited. Products of this combustion pass downstream over turbine rotors driving them to rotate.

The compressor section and a turbine section include a plurality of rotating blades. In addition, there are typically vanes positioned intermediate rows of the blades. The blades and vanes include airfoils.

The airfoils are relatively expensive to manufacture and are heavy. There are also a large number of airfoils at each stage which require an automated repeatable manufacturing process.

Injection or compression molding of thermoplastics, or thermoset resins, produces repeatable low cost lightweight products, however, they generally lack structural performance.

Recently, additive manufacturing techniques have been developed that allow for repeatable and complex geometries to be formed from metal that would otherwise be very expensive to manufacture. However, these techniques lack dimensional control and also have undesirable characteristics in surface finishes.

SUMMARY OF THE INVENTION

In a featured embodiment, a component for a gas turbine engine comprises an airfoil body formed of a plastic. A reinforcement portion has webs formed of a metallic material and extend into the airfoil.

In another embodiment according to the previous embodiment, the webs are buried within the plastic of the body at the airfoil.

In another embodiment according to any of the previous embodiments, the body has a passage and a shaft on the reinforcement portion that extend through the passage.

In another embodiment according to any of the previous embodiments, the shaft connects trunnions at opposed ends of the shaft.

In another embodiment according to any of the previous embodiments, the plastic is one of a thermoplastic or a thermoset resin.

In another embodiment according to any of the previous embodiments, the component is a variable vane.

In another embodiment according to any of the previous embodiments, the trunnions extend outwardly of the body.

In another embodiment according to any of the previous embodiments, the web includes portions extending into the airfoil. A radial dimension is defined along the shaft, with at least some of the webs extending generally perpendicular to the radial direction. Others of the webs extend to have both an axial and a radial component, and interconnected to at least one web extending perpendicularly to the radial component.

In another featured embodiment, a gas turbine engine comprises a compressor section and a turbine section. A component has an airfoil included in at least one of the compressor and turbine sections. The component includes an airfoil body formed of a plastic, and a reinforcement portion. The reinforcement portion has webs formed of a metallic material and extend into the airfoil.

In another embodiment according to any of the previous embodiments, the webs are buried within the plastic of the body at the airfoil.

In another embodiment according to any of the previous embodiments, the body has a passage and a shaft on the reinforcement portion that extend through the passage.

In another embodiment according to any of the previous embodiments, the shaft connects trunnions at opposed ends of the shaft.

In another embodiment according to any of the previous embodiments, the plastic is one of a thermoplastic or a thermoset resin.

In another embodiment according to any of the previous embodiments, the component is a variable vane.

In another embodiment according to any of the previous embodiments, the trunnions extend outwardly of the body.

In another embodiment according to any of the previous embodiments, the web includes portions extending into the airfoil. A radial dimension is defined along the shaft, with at least some of the webs extending generally perpendicular to the radial direction. Others of the webs extend to have both an axial and a radial component, and are interconnected to at least one web extending perpendicularly to the radial component.

In another embodiment according to any of the previous embodiments, a method of forming a component for use in a gas turbine engine includes forming a reinforcement portion including webs by an additive manufacturing process, and placing the reinforcement portion into a plastic mold and placing plastic in the mold around the reinforcement portion, with the plastic forming a body including an airfoil.

In another embodiment according to the previous embodiment, the molded body has a passage and the reinforcement portion has a shaft that extends through the passage and connects trunnions at opposed ends of the shaft.

In another embodiment according to any of the previous embodiments, the webs are buried within the plastic of the body at the airfoil.

In another embodiment according to any of the previous embodiments, the plastic is one of a thermoplastic or a thermoset resin.

These and other features may be best understood from the following drawings and specification.

BRIEF DESCRIPTION OF THE DRAWINGS

FIG. 2 shows an airfoil component for use in a gas turbine engine.

FIG. 3 shows a manufacturing technique for a body.

FIG. 4 schematically shows a manufacturing step in forming the reinforcement portion.

FIG. 5 shows a subsequent step.

DETAILED DESCRIPTION

Figure 1:
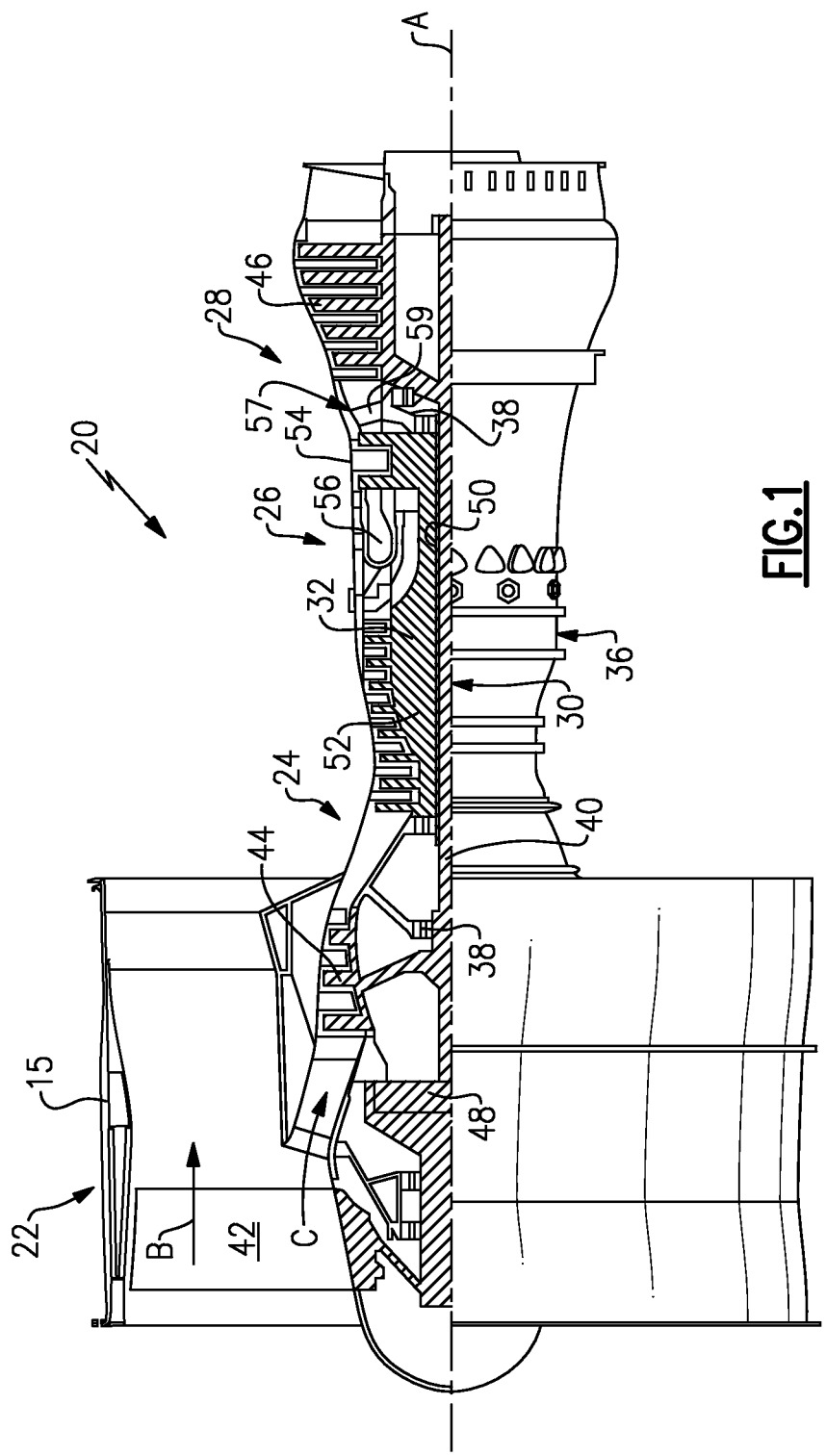
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second.

FIG. 2 shows a component 100 having an airfoil 102 which may be incorporated into a compressor or turbine section. The component 100 is shown as a variable vane which is positioned between rows of blades. However, there are other applications for the techniques to be disclosed below, such as blades or static vanes. The airfoil 102 is formed in large part from a molded plastic body 101. An additive manufacture reinforcement portion 103 may be formed of metallic material. The metallic additive manufacturing portion 103 may include trunnions 104 at each end of shaft 106 and reinforcement webs 108 and 110. As shown, the webs 108 and 110 extend outwardly onto the airfoil 102.

The component 100 has a web 108/110 including portions extending into said airfoil. If a radial dimension R is defined along shaft 106 at least one web 108 extends generally perpendicular to the radial direction R. Other webs 110 extend to have both an axial and a radial component, and interconnect to web 110 that extends perpendicularly to the radial direction R.

FIG. 3 shows the shape of the molded body 101. There are ditches 107 and 109 which will receive the webs 108 and 110. Further, there may be a passage 112 that will receive the shaft 106.

FIG. 4 schematically shows an additive manufacturing tool 124 adding material at 122 to an intermediate part that will become the reinforcement portion 103. As shown, one trunnion 104 has been manufactured.

FIG. 5 shows the reinforcement portion 103 sitting in an injection mold 120. The trunnions 104 are connected by the shaft 106 and the web members 108 and 110 are also shown. It should be understood that mold 120 is shown schematically. Plastic is injected into the mold, such as from a port 200. As known, the mold would include a cavity largely having the reverse shape of the body 101 (see FIG. 3) and, thus, the plastic will be co-molded around burying the reinforcement portion 130, resulting in a component 100, such as shown in FIG. 2. The precise dimensional control and surface finish of a molded thermoplastic can be achieved for the airfoil 102, while the strength and manufacturing benefits of utilizing additive manufacturing can be provided by the reinforcement portion 103.

Thermoset resins may also be used as the molded plastic. Compression molding may also possibly benefit from this disclosure.

Any number of additive manufacturing techniques may be utilized.

Any appropriate thermoplastic may be utilized. As an example, PEI, PEEK, or other plastics formed with carbon or glass fibers may be utilized. Additionally, fiber reinforced thermoset resins may be used such as epoxy, BMI or polyimide in the form of bulk molding compound or sheet molding compound.

A metal utilized to form the reinforcement portion may be nickel superalloy, stainless steel, titanium, aluminum.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A component for a gas turbine engine comprising:
    an airfoil body formed of a plastic;
    a reinforcement portion, said reinforcement portion having webs formed of a metallic material and extending into said airfoil body; and
    wherein said airfoil body having a passage and a shaft on said reinforcement portion extending through said passage.

2. The component for a gas turbine engine as set forth in claim 1, wherein said webs are buried within said airfoil body at said airfoil.

3. The component for a gas turbine engine as set forth in claim 1, wherein said shaft connects trunnions at opposed ends of said shaft.

4. The component for a gas turbine engine as set forth in claim 1, wherein said plastic is one of a thermoplastic or a thermoset resin.

5. The component for a gas turbine engine as set forth in claim 3, wherein said component is a variable vane.

6. The component for a gas turbine engine as set forth in claim 5, wherein said trunnions extend outwardly of said airfoil body.

7. The component for a gas turbine engine as set forth in claim 1, wherein said webs including portions extending into said airfoil, with a radial dimension defined along said shaft, with at least some of said webs extending generally perpendicular to said radial direction, and others of said webs extending to have both an axial and a radial component, and interconnected to at least one web extending perpendicularly to said radial component.

8. A gas turbine engine comprising:
    a compressor section and a turbine section, with a component having an airfoil included in at least one of said compressor and turbine sections;
    said component including an airfoil body formed of a plastic, and a reinforcement portion, said reinforcement portion having webs formed of a metallic material and extending into said airfoil body; and
    wherein said airfoil body having a passage and a shaft on said reinforcement portion extending through said passage.

9. The gas turbine engine as set forth in claim 8, wherein said webs are buried within said airfoil body at said airfoil.

10. The gas turbine engine as set forth in claim 8, wherein said shaft connects trunnions at opposed ends of said shaft.

11. The gas turbine engine as set forth in claim 8, wherein said plastic is one of a thermoplastic or a thermoset resin.

12. The gas turbine engine as set forth in claim 10, wherein said component is a variable vane.

13. The gas turbine engine as set forth in claim 12, wherein said trunnions extend outwardly of said airfoil body.

14. The gas turbine engine as set forth in claim 8, wherein said webs including portions extending into said airfoil, with a radial dimension defined along said shaft, with at least some of said webs extending generally perpendicular to said radial direction, and others of said webs extending to have both an axial and a radial component, and interconnected to at least one web extending perpendicularly to said radial component.

15. A method of forming a component for use in a gas turbine engine comprising:
    forming a reinforcement portion including webs by an additive manufacturing process; and
    placing said reinforcement portion into a plastic mold and placing plastic in said mold around said reinforcement portion, with said plastic forming a body including an airfoil; and
    wherein said airfoil body having a passage and said reinforcement portion having a shaft extending through said passage and connecting trunnions at opposed ends of said shaft.

16. The method as set forth in claim 15, wherein said webs are buried within said airfoil body at said airfoil.

17. The method as set forth in claim 15, wherein said plastic is one of a thermoplastic or a thermoset resin.

\* \* \* \* \*